United States Patent
Prasad et al.

(10) Patent No.: US 11,218,779 B2
(45) Date of Patent: Jan. 4, 2022

(54) METHOD AND APPARATUS FOR COORDINATED CONTENT DELIVERY IN MULTICAST/BROADCAST NETWORKS

(71) Applicant: NOKIA TECHNOLOGIES OY, Espoo (FI)

(72) Inventors: Athul Prasad, Helsinki (FI); Zexian Li, Espoo (FI); Jari Petteri Lunden, Espoo (FI); Mikko Aleksi Uusitalo, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/476,661

(22) PCT Filed: Jan. 9, 2017

(86) PCT No.: PCT/IB2017/050096
§ 371 (c)(1),
(2) Date: Jul. 9, 2019

(87) PCT Pub. No.: WO2018/127739
PCT Pub. Date: Jul. 12, 2018

(65) Prior Publication Data
US 2019/0364393 A1   Nov. 28, 2019

(51) Int. Cl.
*H04L 29/08* (2006.01)
*H04L 12/18* (2006.01)
(Continued)

(52) U.S. Cl.
CPC ......... *H04N 21/64* (2013.01); *H04L 12/1845* (2013.01); *H04L 12/1859* (2013.01);
(Continued)

(58) Field of Classification Search
CPC ............... H04N 21/64; H04N 21/2223; H04N 21/23424; H04N 21/25841;
(Continued)

(56) References Cited

U.S. PATENT DOCUMENTS

| 6,954,790 | B2 | 10/2005 | Forslow |
| 7,296,091 | B1 | 11/2007 | Dutta et al. |

(Continued)

FOREIGN PATENT DOCUMENTS

| CN | 101247250 A | 8/2008 |
| CN | 101523825 A | 9/2009 |

(Continued)

OTHER PUBLICATIONS

Office Action for European Application No. 17 701 594.8 dated Apr. 20, 2020, 9 pages.

(Continued)

*Primary Examiner* — Christopher B Robinson
(74) *Attorney, Agent, or Firm* — Alston & Bird LLP

(57) ABSTRACT

A method, apparatus and computer program products are provided for facilitating coordinated content delivery in multicast/broadcast networks. One example method includes receiving content from a service provider during a content service period, identifying a content service break period, the content service break period characterized by a break in transmission of content from the service provider intended for user devices, fetching localized content, and causing delivery of the localized content during the content service break period, the delivery of the localized content being performed via Xcast to determine a most radio resource efficient delivery mechanism.

19 Claims, 12 Drawing Sheets

(51) Int. Cl.
| | |
|---|---|
| H04W 4/02 | (2018.01) |
| H04N 21/64 | (2011.01) |
| H04L 12/26 | (2006.01) |
| H04N 21/81 | (2011.01) |
| H04N 21/222 | (2011.01) |
| H04N 21/258 | (2011.01) |
| H04N 21/647 | (2011.01) |
| H04N 21/262 | (2011.01) |
| H04N 21/234 | (2011.01) |
| H04W 4/06 | (2009.01) |
| H04L 29/06 | (2006.01) |

(52) U.S. Cl.
CPC ...... *H04L 12/1877* (2013.01); *H04L 12/1881* (2013.01); *H04L 43/028* (2013.01); *H04L 65/605* (2013.01); *H04N 21/2223* (2013.01); *H04N 21/23424* (2013.01); *H04N 21/25841* (2013.01); *H04N 21/26241* (2013.01); *H04N 21/64707* (2013.01); *H04N 21/812* (2013.01); *H04W 4/06* (2013.01); *H04L 12/185* (2013.01); *H04L 12/189* (2013.01)

(58) Field of Classification Search
CPC .......... H04N 21/26241; H04L 12/1845; H04L 12/1859; H04L 12/1877; H04L 12/1881; H04L 43/028; H04L 65/605
See application file for complete search history.

(56) References Cited

U.S. PATENT DOCUMENTS

| | | | |
|---|---|---|---|
| 8,111,630 B2 | 2/2012 | Kovvali et al. | |
| 8,155,628 B1 | 4/2012 | Sennett et al. | |
| 8,331,982 B2 | 12/2012 | Hong et al. | |
| 9,065,906 B2 | 6/2015 | Dankberg et al. | |
| 9,106,964 B2 | 8/2015 | Zhao | |
| 9,380,079 B2 | 6/2016 | White et al. | |
| 9,402,107 B2 | 7/2016 | Gender et al. | |
| 10,555,046 B2 | 2/2020 | Prasad | |
| 2002/0196125 A1* | 12/2002 | Yu | G06Q 30/02 340/7.48 |
| 2006/0107302 A1 | 5/2006 | Zdepski | |
| 2007/0127478 A1 | 6/2007 | Jokela et al. | |
| 2007/0206548 A1* | 9/2007 | Toskala | H04L 12/189 370/338 |
| 2007/0220573 A1 | 9/2007 | Chiussi et al. | |
| 2008/0198848 A1 | 8/2008 | Yamagishi | |
| 2009/0104871 A1 | 4/2009 | Cho | |
| 2009/0313380 A1* | 12/2009 | Kurihara | H04L 12/18 709/230 |
| 2010/0023338 A1 | 1/2010 | Petronelli et al. | |
| 2010/0034089 A1 | 2/2010 | Kovvali et al. | |
| 2010/0074113 A1 | 3/2010 | Muramoto et al. | |
| 2010/0122288 A1 | 5/2010 | Minter et al. | |
| 2010/0195558 A1 | 8/2010 | Koskinen | |
| 2010/0235877 A1 | 9/2010 | Hu et al. | |
| 2011/0083153 A1* | 4/2011 | Cedervall | H04L 65/4076 725/88 |
| 2011/0107364 A1* | 5/2011 | Lajoie | H04L 65/1016 725/25 |
| 2012/0230240 A1 | 9/2012 | Benat et al. | |
| 2012/0257015 A1 | 10/2012 | Kim et al. | |
| 2013/0111520 A1 | 5/2013 | Lo et al. | |
| 2013/0286960 A1* | 10/2013 | Li | H04W 72/042 370/329 |
| 2014/0052680 A1 | 2/2014 | Nitz et al. | |
| 2014/0254456 A1 | 9/2014 | Roh | |
| 2014/0344344 A1* | 11/2014 | Beckman | H04L 67/1097 709/203 |
| 2015/0078245 A1 | 3/2015 | Anchan | |
| 2015/0381756 A1 | 12/2015 | Lotfallah et al. | |
| 2016/0012252 A1 | 1/2016 | Deleeuw et al. | |
| 2016/0029050 A1 | 1/2016 | Thornburgh | |
| 2016/0073176 A1* | 3/2016 | Phillips | H04L 47/15 725/35 |
| 2016/0127801 A1 | 5/2016 | Baldwin | |
| 2017/0164161 A1 | 6/2017 | Gupta et al. | |

FOREIGN PATENT DOCUMENTS

| | | | | |
|---|---|---|---|---|
| CN | 101605042 A | | 12/2009 | |
| CN | 103119905 A | * | 5/2013 | ......... H04L 65/4023 |
| CN | 105519147 A | | 4/2016 | |
| CN | 105532023 A | | 4/2016 | |
| WO | WO 2004/088985 | | 10/2004 | |
| WO | WO 2018 127739 A1 | | 7/2018 | |

OTHER PUBLICATIONS

Miracast—Wikipedia [online] [retrieved Apr. 14, 2020]. Retrieved from the Internet: https://en.wikipedia.org/w/index.php?title=Miracast &oldid=756036805 (dated Dec. 21, 2016) 5 pages.
Office Action for U.S. Appl. No. 15/664,822 dated Apr. 5, 2018.
Office Action for U.S. Appl. No. 15/664,822 dated May 15, 2019.
Office Action for U.S. Appl. No. 15/664,822 dated Aug. 28, 2018.
Notice of Allowance for U.S. Appl. No. 15/664,822 dated Sep. 20, 2019.
International Search Report and Written Opinion dated Oct. 18, 2018 for PCT/US18/044640, 14 pages.
*Feasible Study on Enhancement of LTE for Efficient Delivery Video/High Definition*, 3GPP TSG-SA WG1 Meeting#75, S1-162525 (Aug. 2016) 5 pages.
FitzGerald, D., *AT&T Chief Outlines Plans for Running Time Warner—WSJ*, Watch TV, FOX NewsNetwork, LLC (May 24, 2017) 3 pages.
Prasad, A. et al., *Enabling Group Communication for Public Safety in LTE—Advanced Networks*, Journal of Network and Computer Applications 62 (2016) 41-52.
Feldman, B. et al. "Explicit Multicast (Xcast) Concepts and Options; rfc5058.txt", Network Working Group RFC 1717, Internet Society 4, Rue Des Falaises Ch-1205, Geneva, Switzerland, dated Nov. 1, 2007.
"Multimedia Content Delivery in SDNn and NFV-based Towards 5G Networks" [online] [retrieved Jul. 29, 2019], retrieved from the Internet:, <https://www.researchgate.net/publication/282150491_Multimedia_Content_Delivery_in_SDN_and_NFV-based_Towards_5G_Networks> dated Jul. 2015.
International Search Report and Written Opinion for International Application No. PCT/IB2017/050096 dated Aug. 1, 2017.
CMCC et al. "New WID on Enhancement of LTE for Efficient delivery Video/High Definition", China Telecommunications, dated Aug. 22-26, 2016.
Office Action for Chinese Application No. 201780082605.1 dated Jun. 3, 2021, 14 pages.
Office Action for European Application No. 18756345.7 dated Sep. 6, 2021, 5 pages.

\* cited by examiner

METHOD AND APPARATUS FOR COORDINATED CONTENT DELIVERY IN MULTICAST/BROADCAST NETWORKS

CROSS-REFERENCE TO RELATED APPLICATIONS

The present application is a national phase entry of International Application No. PCT/IB2017/050096, filed Jan. 9, 2017, which is incorporated herein by reference in its entirety.

TECHNOLOGICAL FIELD

Embodiments described herein generally relate to content delivery in wireless networks. In particular, embodiments described herein relate to content delivery in radio access networks (for example, 5G or the like) and other, for example, existing or future generations of wireless/mobile networks and, specifically to a method, apparatus, and computer program product for coordinated content delivery in multicast/broadcast networks.

BACKGROUND

While existing and contemplated future wireless and mobile networks do provide means for provisioning traditional multicast (MC)/broadcast (BC) content such as TV shows, movies, sports programs, etc., to a wide variety of users, the functionality does not enable dynamic and location specific content delivery to end users.

In this regard, areas for improving known and existing conventional and/or existing systems have been identified. Through applied effort, ingenuity, and innovation, solutions to improve such systems have been realized and are described in connection with embodiments of the present invention.

BRIEF SUMMARY

Embodiments described herein provide inter-working functionality between, for example, a content provider and a mobile network operator, enabling dynamic and location specific content delivery.

A method, apparatus and computer program product are therefore provided according to an example embodiment of the present invention for coordinated content delivery in multicast/broadcast networks.

In some embodiments, a method may be provided comprising receiving content from a service provider during a content service period, identifying a content service break period, the content service break period characterized by a break in transmission of content from the service provider intended for user devices, fetching localized content, and causing delivery of the localized content during the content service break period, the delivery of the localized content being performed via Xcast to determine a most radio resource efficient delivery mechanism.

In some embodiments, wherein the content comprises packet marking. In some embodiments, the service break period is dynamic, and the method further comprises identifying, within the packet marking of the content, an indication of the content service break period.

In some embodiments, the method may further comprise continuing to receive content comprising packet marking from the service provider, identifying, within the packet marking of the content, an indication of an end to the content service break period, causing a discontinuance of the delivery of the localized content and resumption of the content from the service provider.

In some embodiments, the method may further comprise identifying, within the packet marking of the content, an indication of an upcoming transition to the content service break period, causing initiation of the fetching of the localized content.

In some embodiments, the content service break period is scheduled. In some embodiments, the method may further comprise determining a scheduled service break period characterized in that content is not received from the content provider.

In some embodiments, the method may further comprise determining a scheduled service break period characterized in that content received from the service provider during a scheduled content service break period is not transmitted, causing replacement of the content received from the service provider during the scheduled content service break period with the localized content.

In some embodiments, the method may further comprise for transmission during the scheduled service break period, scheduling localized content.

In some embodiments, the method may further comprise determining or receiving information indicative of a location of a user device, wherein the localized content is fetched in accordance with the location of the user device.

In some embodiments, the method may further comprise determining or receiving information indicative of a particular application being executed at the user device, wherein the localized content is fetched in accordance with the particular application.

In some embodiments, the method may further comprise determining or receiving information indicative of a location of a user device, wherein the localized content is beam-specific content.

In some embodiments, the method may further comprise mapping, within a sliced network comprising separate slices of MC/BC traffic, the beam-specific content from a localized source to appropriate slices.

In some embodiments, the method may further comprise transmitting the content to a base station for distribution to one or more user devices.

In some embodiments, an apparatus may be provided comprising means for receiving content from a service provider during a content service period, means for identifying a content service break period, the content service break period characterized by a break in transmission of content from the service provider intended for user devices, means for fetching localized content, and means for causing delivery of the localized content during the content service break period, the delivery of the localized content being performed via Xcast to determine a most radio resource efficient delivery mechanism.

In some embodiments, the content comprises packet marking. In some embodiments, the service break period is dynamic, and the apparatus further comprises identifying, within the packet marking of the content, an indication of the content service break period.

In some embodiments, the apparatus may further comprise continuing to receive content comprising packet marking from the service provider, identifying, within the packet marking of the content, an indication of an end to the content service break period, causing a discontinuance of the delivery of the localized content and resumption of the content from the service provider.

In some embodiments, the apparatus may further comprise identifying, within the packet marking of the content, an indication of an upcoming transition to the content service break period, causing initiation of the fetching of the localized content.

In some embodiments, the content service break period is scheduled. In some embodiments, the apparatus may further comprise determining a scheduled service break period characterized in that content is not received from the content provider.

In some embodiments, the apparatus may further comprise determining a scheduled service break period characterized in that content received from the service provider during a scheduled content service break period is not transmitted, and causing replacement of the content received from the service provider during the scheduled content service break period with the localized content.

In some embodiments, the apparatus may further comprise for transmission during the scheduled service break period, scheduling localized content.

In some embodiments, the apparatus may further comprise determining or receiving information indicative of a location of a user device, wherein the localized content is fetched in accordance with the location of the user device.

In some embodiments, the apparatus may further comprise determining or receiving information indicative of a particular application being executed at the user device, wherein the localized content is fetched in accordance with the particular application.

In some embodiments, the apparatus may further comprise determining or receiving information indicative of a location of a user device, wherein the localized content is beam-specific content.

In some embodiments, the apparatus may further comprise mapping, within a sliced network comprising separate slices of MC/BC traffic, the beam-specific content from a localized source to appropriate slices.

In some embodiments, the apparatus may further comprise transmitting the content to a base station for distribution to one or more user devices.

In some embodiments, a computer program product may be provided, the computer program product comprising at least one non-transitory computer-readable storage medium having computer-executable program code instructions stored therein, the computer-executable program code instructions comprising program code instructions for receiving content from a service provider during a content service period, identifying a content service break period, the content service break period characterized by a break in transmission of content from the service provider intended for user devices, fetching localized content, and causing delivery of the localized content during the content service break period, the delivery of the localized content being performed via Xcast to determine a most radio resource efficient delivery mechanism.

In some embodiments, the content comprises packet marking. In some embodiments, the service break period is dynamic, and wherein the computer-executable program code instructions further comprise program code instructions for identifying, within the packet marking of the content, an indication of the content service break period.

In some embodiments, the computer-executable program code instructions further comprise program code instructions for continuing to receive content comprising packet marking from the service provider, identifying, within the packet marking of the content, an indication of an end to the content service break period, and causing a discontinuance of the delivery of the localized content and resumption of the content from the service provider.

In some embodiments, the computer-executable program code instructions further comprise program code instructions for identifying, within the packet marking of the content, an indication of an upcoming transition to the content service break period, and causing initiation of the fetching of the localized content.

In some embodiments, the content service break period is scheduled. In some embodiments, the computer-executable program code instructions further comprise program code instructions for determining a scheduled service break period characterized in that content is not received from the content provider.

In some embodiments, the computer-executable program code instructions further comprise program code instructions for determining a scheduled service break period characterized in that content received from the service provider during a scheduled content service break period is not transmitted, and causing replacement of the content received from the service provider during the scheduled content service break period with the localized content.

In some embodiments, the computer-executable program code instructions further comprise program code instructions for transmission during the scheduled service break period, scheduling localized content.

In some embodiments, the computer-executable program code instructions further comprise program code instructions for determining or receiving information indicative of a location of a user device, wherein the localized content is fetched in accordance with the location of the user device.

In some embodiments, the computer-executable program code instructions further comprise program code instructions for determining or receiving information indicative of a particular application being executed at the user device, wherein the localized content is fetched in accordance with the particular application.

In some embodiments, the computer-executable program code instructions further comprise program code instructions for determining or receiving information indicative of a location of a user device, wherein the localized content is beam-specific content.

In some embodiments, the computer-executable program code instructions further comprise program code instructions for mapping, within a sliced network comprising separate slices of MC/BC traffic, the beam-specific content from a localized source to appropriate slices.

In some embodiments, the computer-executable program code instructions further comprise program code instructions for transmitting the content to a base station for distribution to one or more user devices.

In some embodiments, an apparatus may be provided, the apparatus comprising at least one processor and at least one memory including computer program code, the at least one memory and the computer program code configured to, with the processor, cause the apparatus to at least receive content from a service provider during a content service period, identify a content service break period, the content service break period characterized by a break in transmission of content from the service provider intended for user devices, fetch localized content, and cause delivery of the localized content during the content service break period, the delivery of the localized content being performed via Xcast to determine a most radio resource efficient delivery mechanism. In some embodiments, the content comprises packet marking.

In some embodiments, the service break period is dynamic, and the at least one memory and the computer program code are further configured to, with the processor, cause the apparatus to identify, within the packet marking of the content, an indication of the content service break period.

In some embodiments, the at least one memory and the computer program code are further configured to, with the processor, cause the apparatus to continue to receive content comprising packet marking from the service provider, identify, within the packet marking of the content, an indication of an end to the content service break period, and cause a discontinuance of the delivery of the localized content and resumption of the content from the service provider.

In some embodiments, the at least one memory and the computer program code are further configured to, with the processor, cause the apparatus to identify, within the packet marking of the content, an indication of an upcoming transition to the content service break period, and cause initiation of the fetching of the localized content.

In some embodiments, the content service break period is scheduled. In some embodiments, the at least one memory and the computer program code are further configured to, with the processor, cause the apparatus to determine a scheduled service break period characterized in that content is not received from the content provider.

In some embodiments, the at least one memory and the computer program code are further configured to, with the processor, cause the apparatus to determine a scheduled service break period characterized in that content received from the service provider during a scheduled content service break period is not transmitted, and cause replacement of the content received from the service provider during the scheduled content service break period with the localized content.

In some embodiments, the at least one memory and the computer program code are further configured to, with the processor, cause the apparatus to for transmission during the scheduled service break period, schedule localized content.

In some embodiments, the at least one memory and the computer program code are further configured to, with the processor, cause the apparatus to determine or receiving information indicative of a location of a user device, wherein the localized content is fetched in accordance with the location of the user device.

In some embodiments, the at least one memory and the computer program code are further configured to, with the processor, cause the apparatus to determine or receiving information indicative of a particular application being executed at the user device, wherein the localized content is fetched in accordance with the particular application.

In some embodiments, the at least one memory and the computer program code are further configured to, with the processor, cause the apparatus to determine or receiving information indicative of a location of a user device, wherein the localized content is beam-specific content.

In some embodiments, the at least one memory and the computer program code are further configured to, with the processor, cause the apparatus to map, within a sliced network comprising separate slices of MC/BC traffic, the beam-specific content from a localized source to appropriate slices.

In some embodiments, the at least one memory and the computer program code are further configured to, with the processor, cause the apparatus to transmit the content to a base station for distribution to one or more user devices.

BRIEF DESCRIPTION OF THE DRAWINGS

Figure 1:
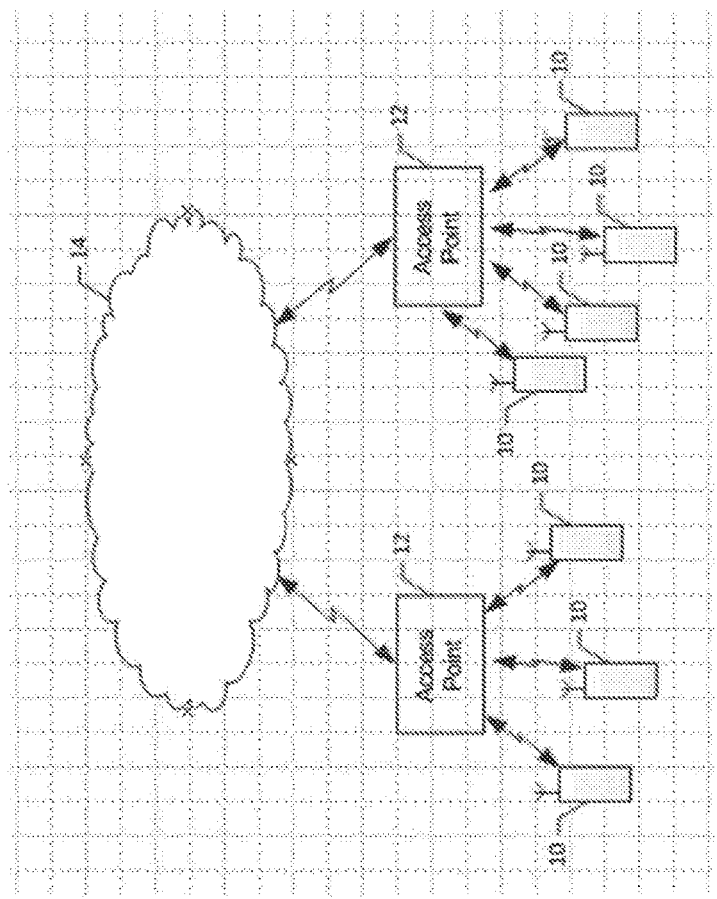
Figure 2:
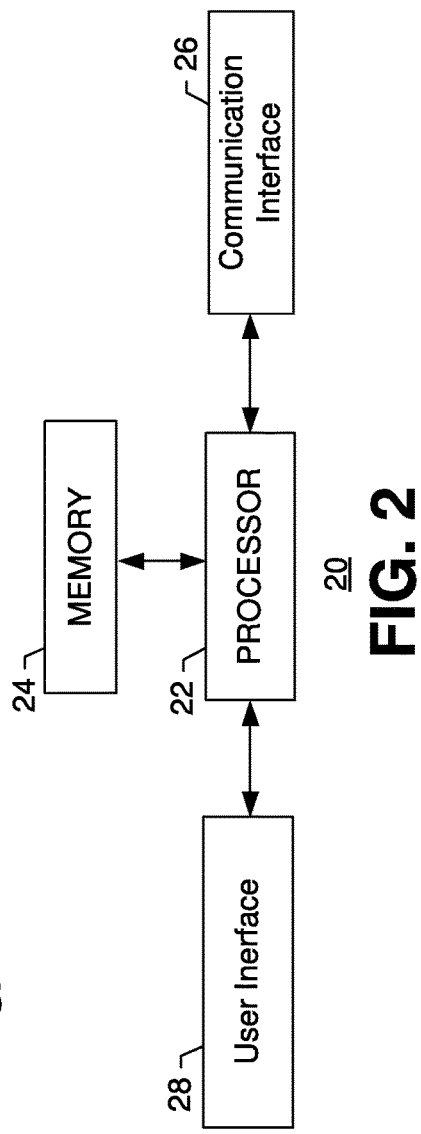
Figure 4:
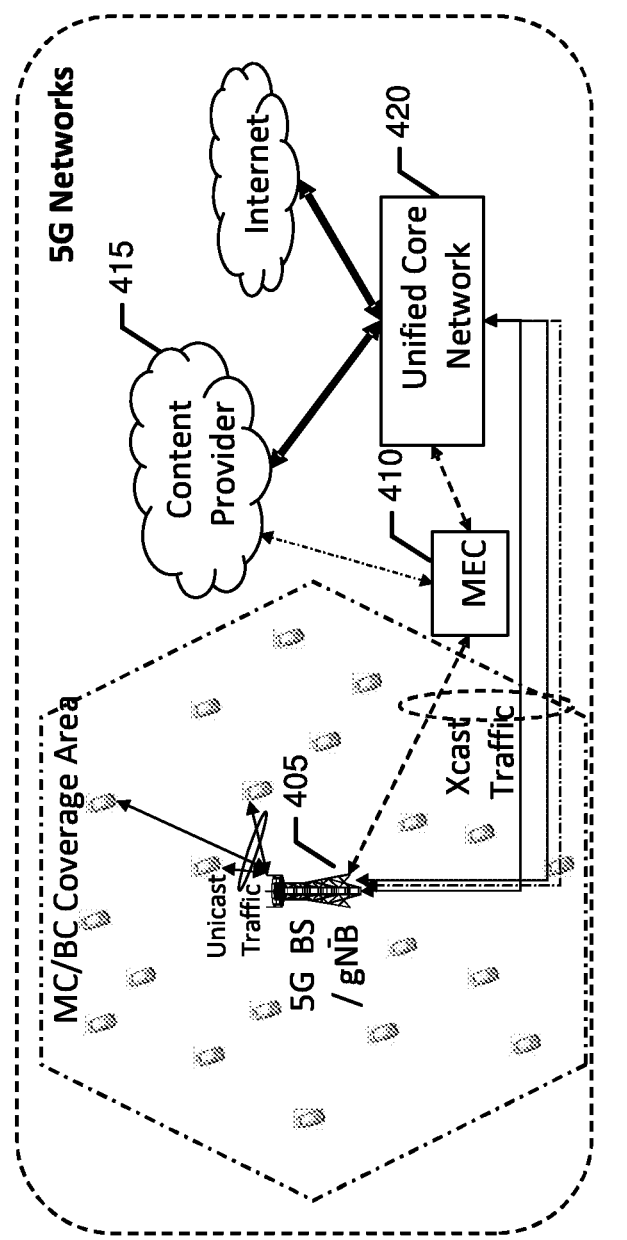
Figure 5A:
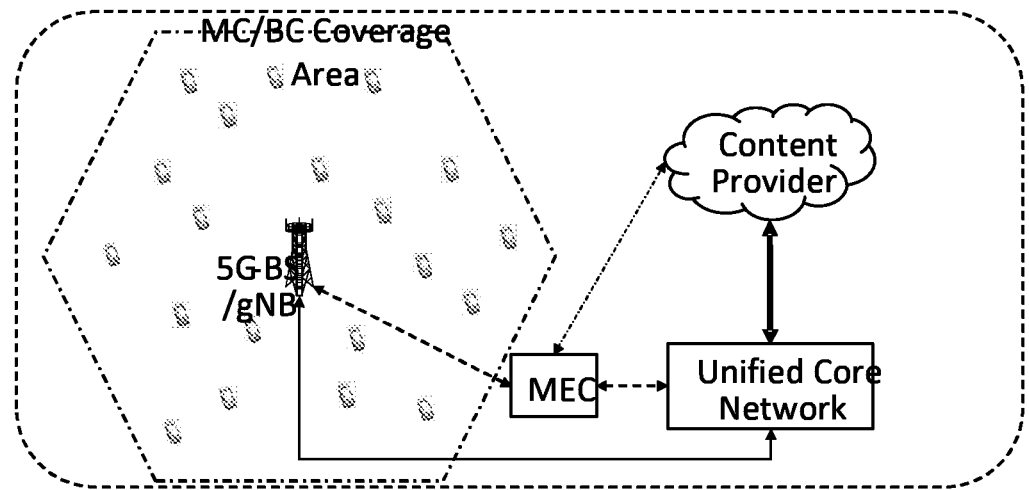
Figure 5B:
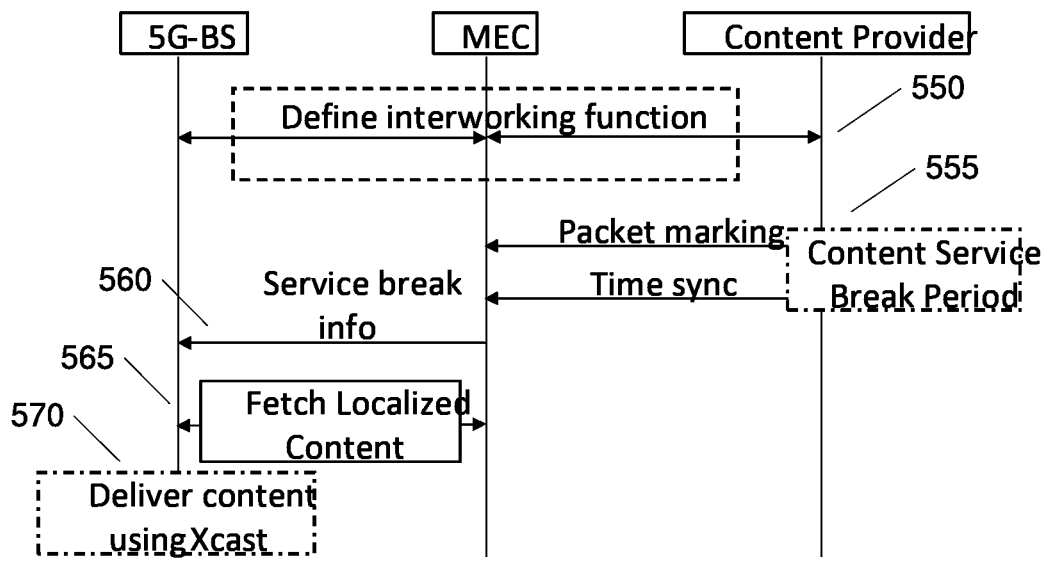
Figure 6:
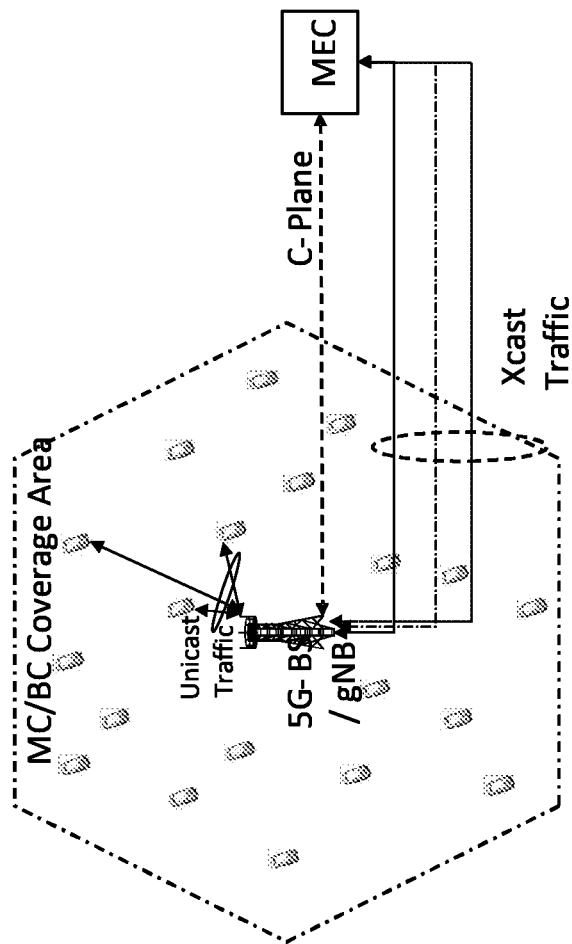
Figure 7:
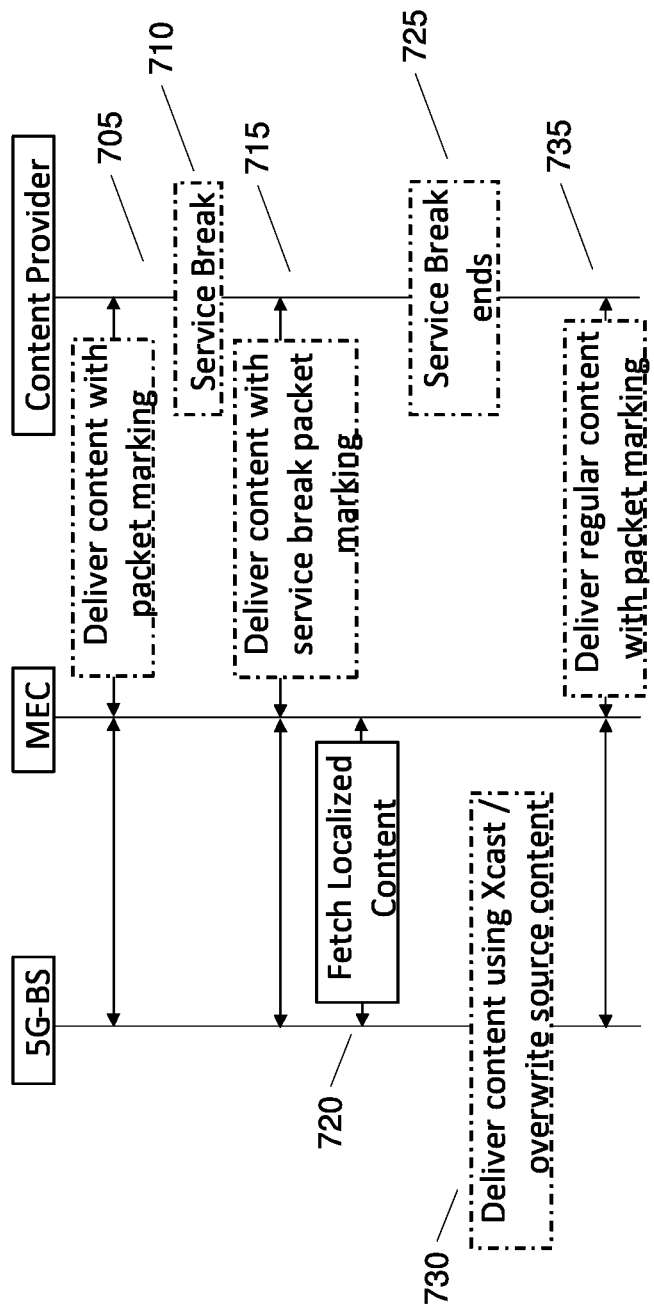
Figure 8A:
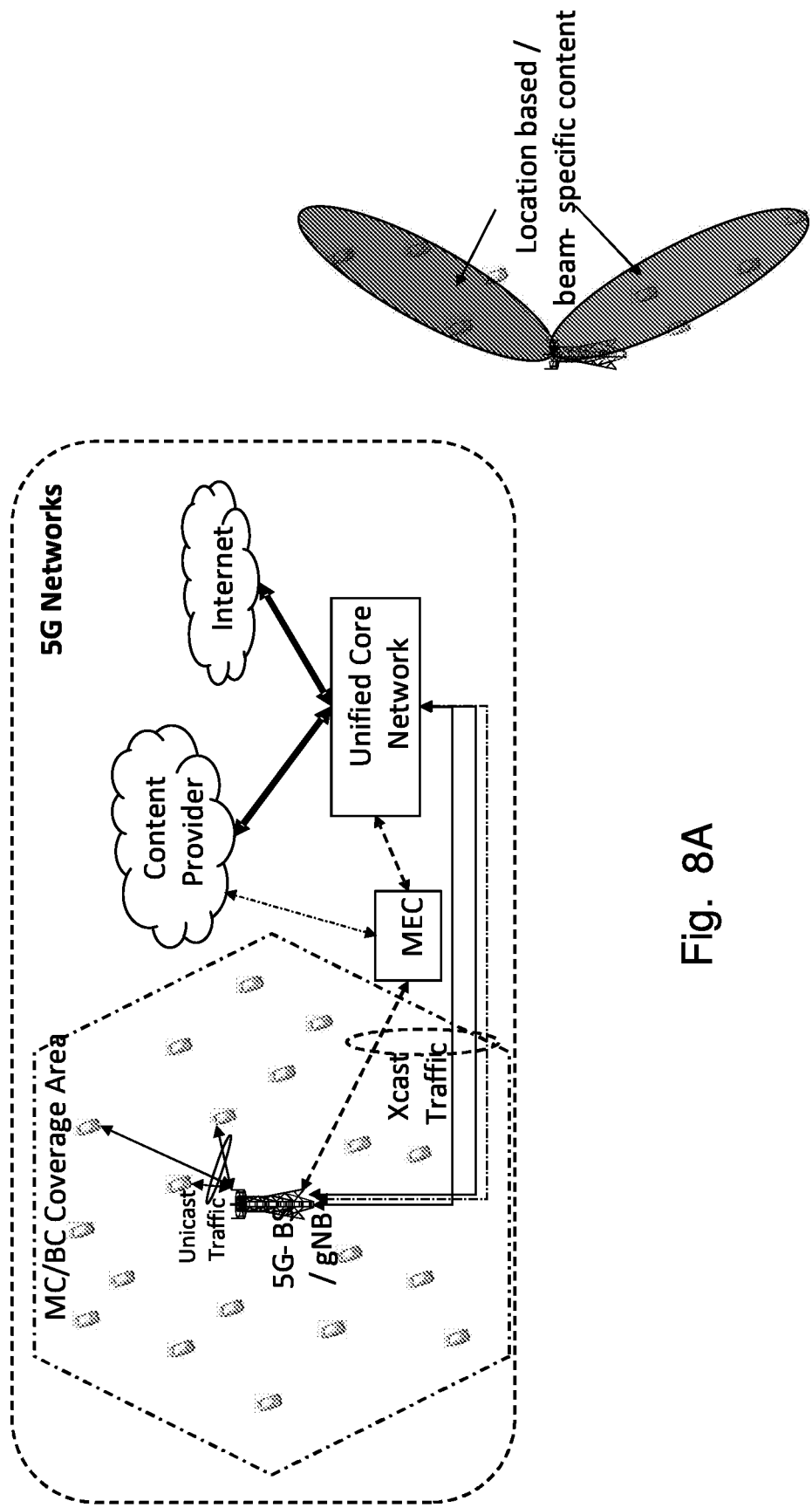
Figure 8B:
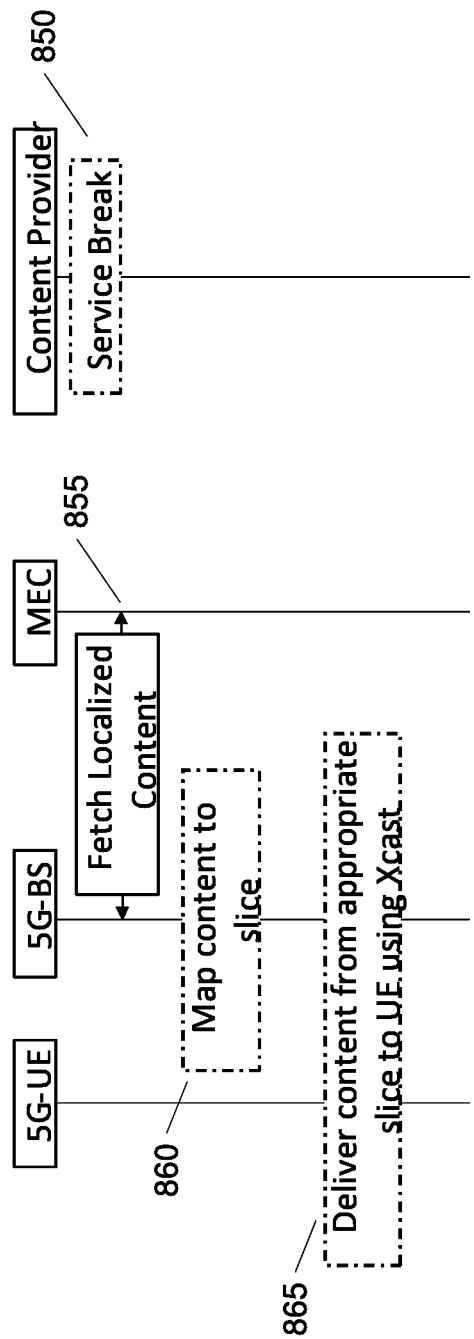
Figure 9:
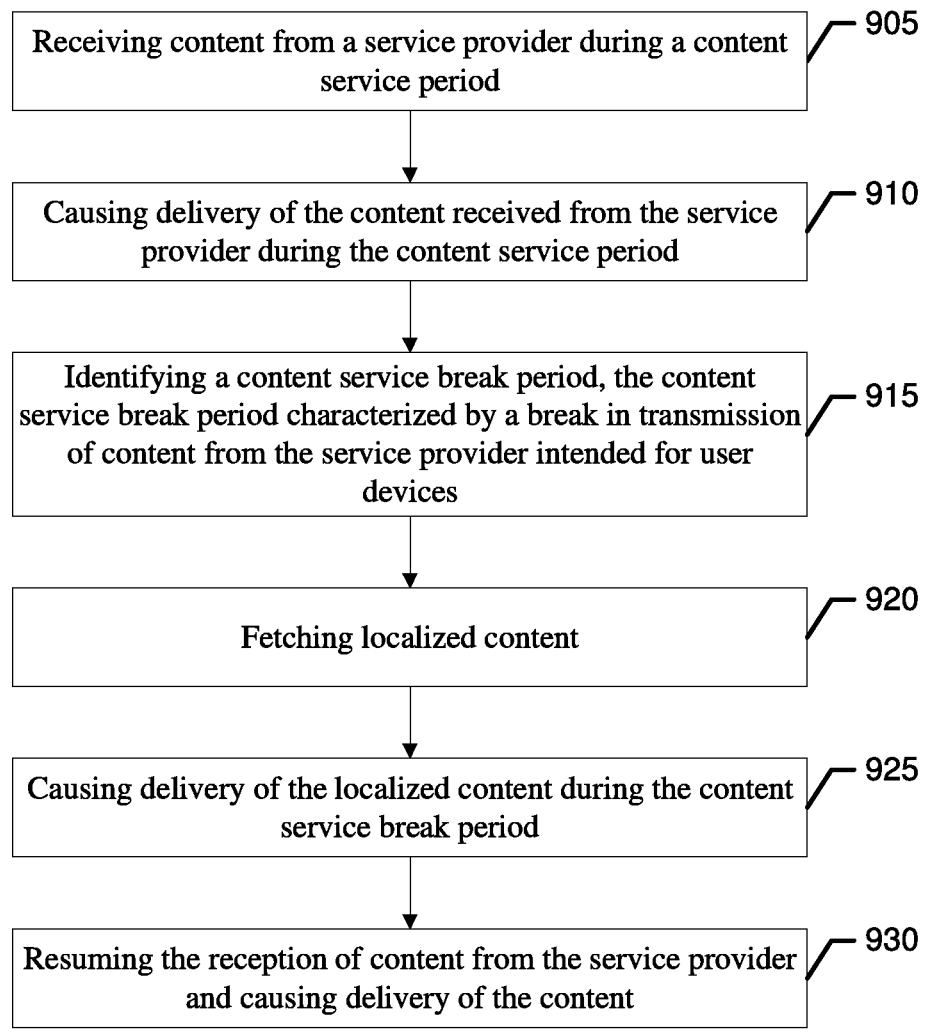
Figure 10:
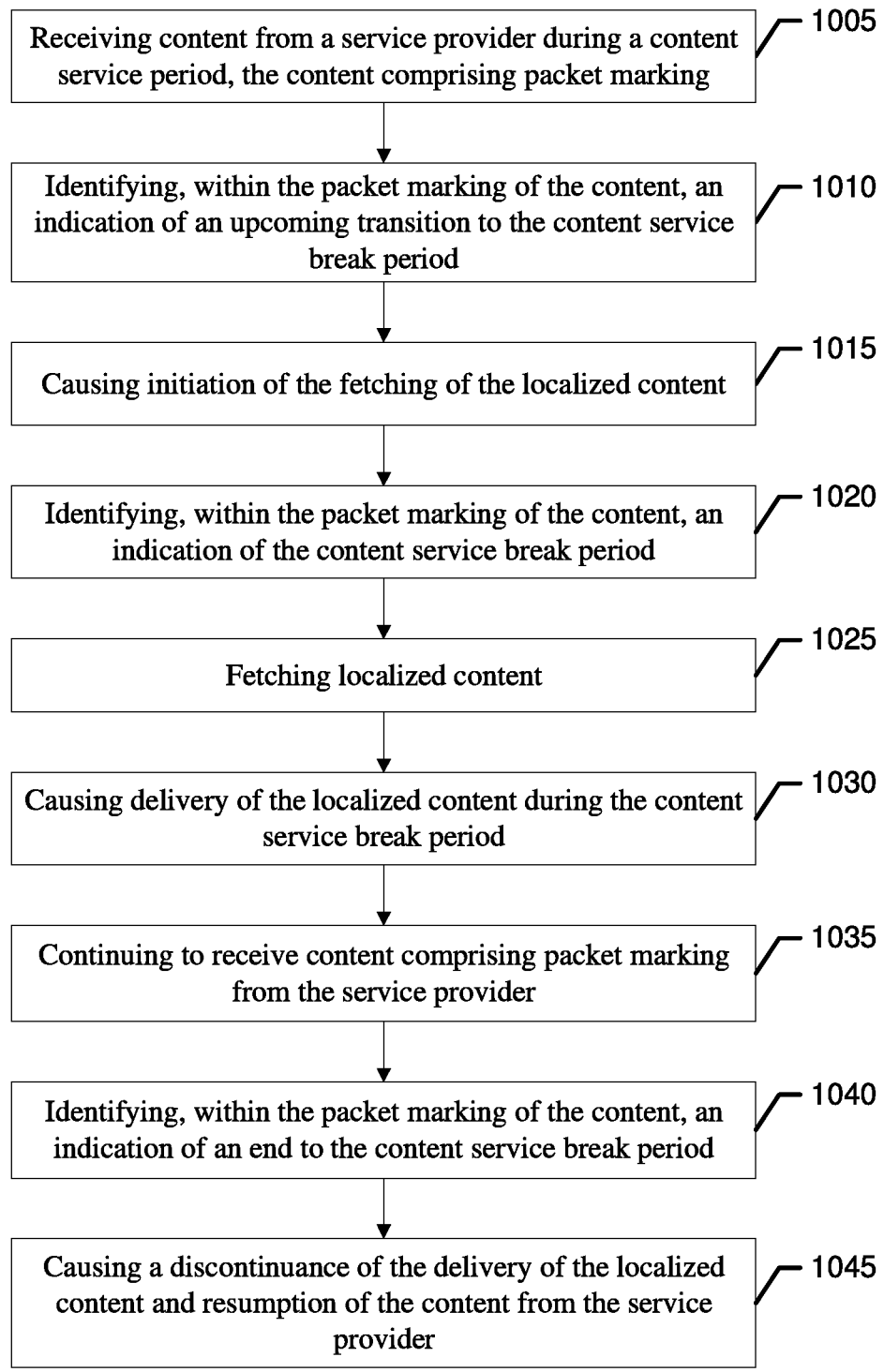
Figure 11:
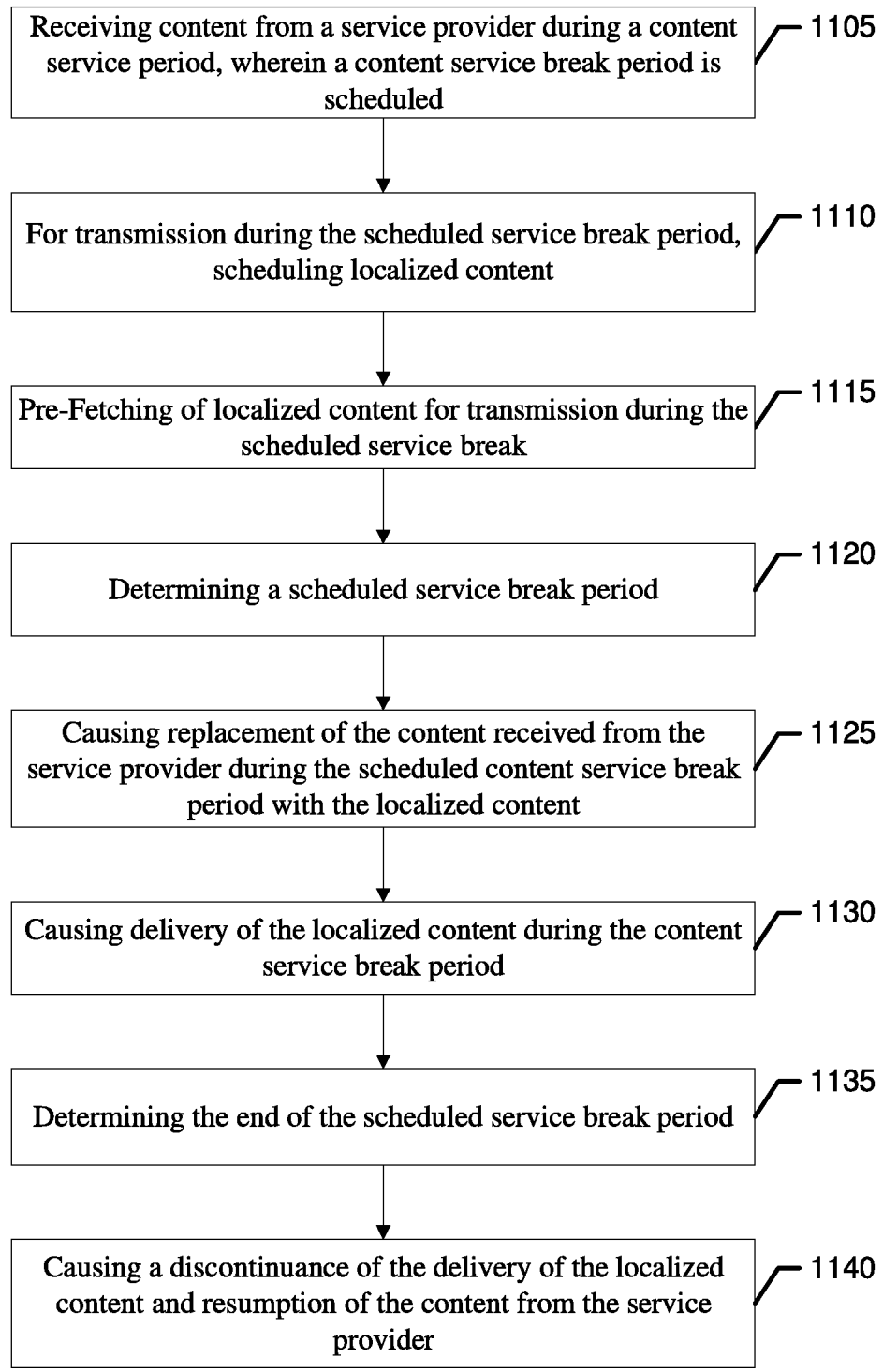
Figure 12:
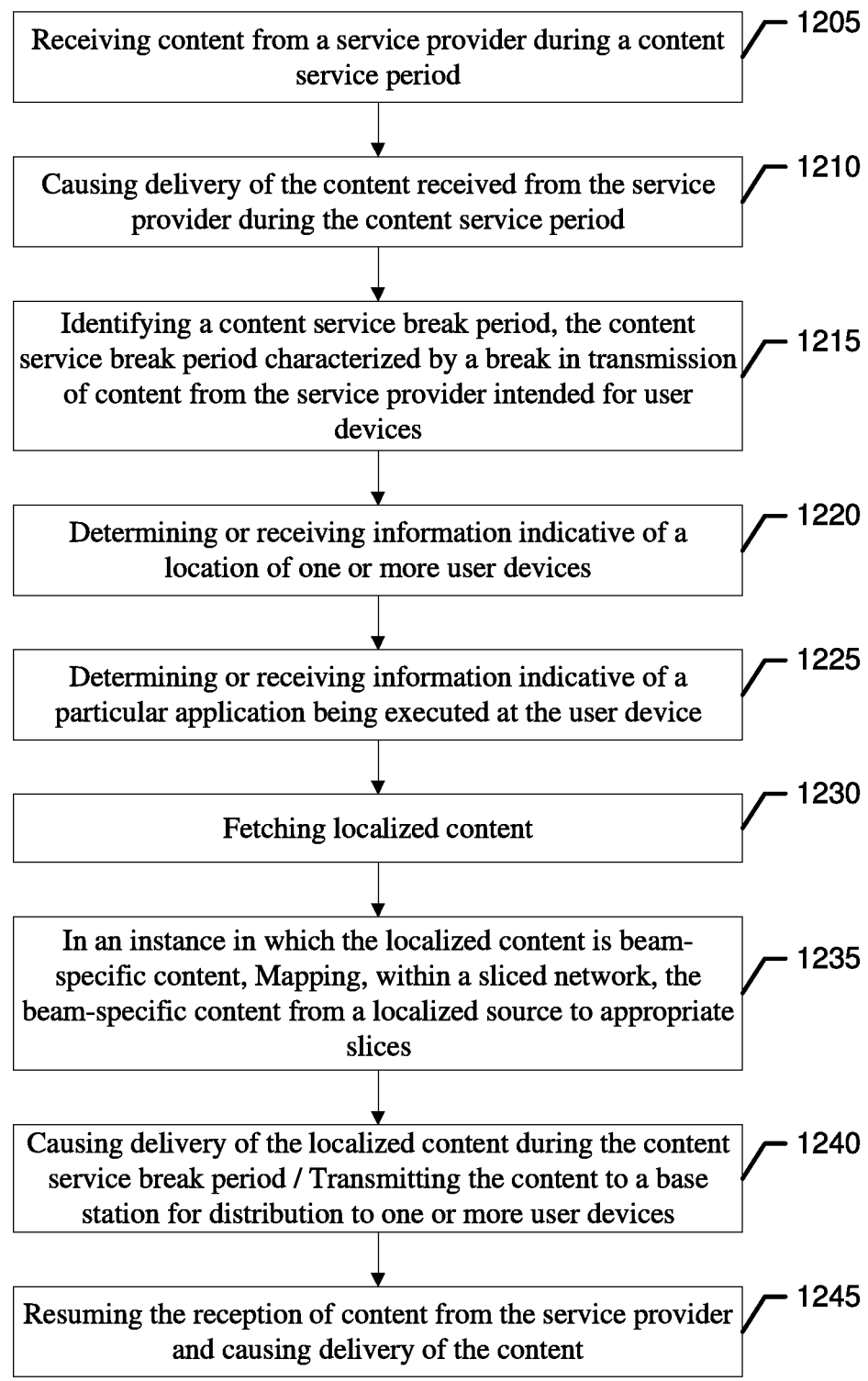

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is block diagram of a system that may be specifically configured in accordance with an example embodiment of the present invention;

FIG. 4 is block diagram of a system that may be specifically configured in accordance with an example embodiment of the present invention;

FIG. 5A is block diagram of a system that may be specifically configured in accordance with an example embodiment of the present invention;

FIG. 5B is a data flow diagram showing an exemplary operation of an example system in accordance with an embodiment of the present invention;

FIG. 6 is block diagram of a system that may be specifically configured in accordance with an example embodiment of the present invention;

FIG. 7 is a data flow diagram showing an exemplary operation of an example system in accordance with an embodiment of the present invention;

FIG. 8A is block diagram of a system that may be specifically configured in accordance with an example embodiment of the present invention;

FIG. 8B is a data flow diagram showing an exemplary operation of an example system in accordance with an embodiment of the present invention;

FIG. 9 is a flowchart showing an exemplary method of operating an example apparatus in accordance with an embodiment of the present invention;

FIG. 10 is a flowchart showing an exemplary method of operating an example apparatus in accordance with an embodiment of the present invention;

FIG. 11 is a flowchart showing an exemplary method of operating an example apparatus in accordance with an embodiment of the present invention; and FIG. 12 is a flowchart showing an exemplary method of operating an example apparatus in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

System Architecture

Referring now to FIG. 1, which illustrates an example system that supports communications between a plurality of stations 10 and one or more radio base stations/access points 12 (for example, a high density system scenario where a plurality of radio base stations/access points may be deployed to a geographical area and may be operating on the same frequency channel), each radio base station/access point may communicate with one or more stations and, in one embodiment, may communicate with a large number of stations. The radio base stations/access points may, in turn, communicate with a network 14. While the radio base stations/access points may communicate via 5G, an Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11ah or 802.11ac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like, as well as other standards, for example, with respect to multi-domain networks, that may include, industrial wireless communication networks such as WirelessHART, Bluetooth, ZigBee etc. and/or the like.

The radio base stations/access points 12 and the stations 10 may communicate via wireline communications, but most commonly communicate via wireless communications. For example, the radio base stations/access points and the stations may communicate in a sub 1 GHz band as defined by IEEE 802.11ah standard or in a 5 GHz band, which may be defined by, for example, IEEE 802.11ac standard. The radio base station/access point may be embodied by any of a variety of network entities, such as an access point, a base station, a Node B, an evolved Node B (eNB), a radio network controller (RNC), a mobile device/a station (for example, mobile telephones, smart phones, portable digital assistants (PDAs), pagers, laptop computers, tablet computers or any of numerous other hand held or portable communication devices, computation devices, content generation devices, content consumption devices, or combinations thereof), or the like. The stations may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, vehicular or transportation automation application, in healthcare and fitness applications, in building automation and control applications and/or in temperature sensing applications. Stations that are embodied by sensors or meters may be utilized in some embodiments to backhaul sensor and meter data. Alternatively, the stations may be embodied by mobile terminals or user equipment(s) (UE), such as mobile communication devices, for example, mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the station is embodied by a mobile terminal, the communication between an access point and the station may serve to extend the range of Wi-Fi or another wireless local area network (WLAN), such as by extending the range of a hotspot, and to offload traffic that otherwise would be carried by a cellular or other network.

The radio base station/access point 12 and/or the station 10 may be embodied as or otherwise include an apparatus 20 that is specifically configured to perform the functions of the respective device, as generically represented by the block diagram of FIG. 2. While the apparatus may be employed, for example, by a radio base station/access point or a station, it should be noted that the components, devices or elements described below may not be mandatory and thus some may be omitted in certain embodiments. Additionally, some embodiments may include further or different components, devices or elements beyond those shown and described herein.

Apparatus Architecture

Regardless of the type of device that embodies the radio base station/access point 12 and/or the station 10, the radio base station/access point 12 and/or the station 10 may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (for example, near-eye-display), in the air, etc. The user interface may also be in communication with the memory 24 and/or the communication interface 26, such as via a bus.

Environment

Multimedia Broadcast/Multicast Service (MBMS) was first introduced in the 3G system to provide an efficient means of provisioning traditional multicast/broadcast (MC/BC) content such as TV shows, movies, sports programs, etc., to a wide variety of users. While MBMS technology may have been traditionally tailored for traditional mobile broadband, rather than long-distance broadcast, making widespread adoption challenging, 4G systems, (e.g., through the use of enhanced MBMS (eMBMS) multi-cell transmissions using single frequency network (SFN) setup) have provided an environment configured for enabling wide area transmission of traditional broadcast content. Currently, further enhanced MBMS (feMBMS) studies are ongoing in 3GPP for enhancing the cyclic prefix (CP) of the MBMS transmissions even further to enable high-power, high-tower long distance transmission of traditional broadcast content, making it economically viable deployment option for traditional broadcasters.

Current MBMS technology, in terms of adoption by the mobile network operators, also lacks availability of a viable revenue sharing model between the traditional broadcast content providers and mobile network operators. One of the key commodities for sharing in order to provide cost efficiency could be the traditional broadcast frequency bands. But in several markets, some of the currently existing traditional broadcast bands are already being re-framed for mobile broadband networks. Conventional approaches fail to achieve necessary targets enabling cost efficient and economically feasible multicast/broadcast technologies.

Mobile edge computing (MEC) is a key technology component expected to play a significant role in the field of next generation multicast/broadcast technologies. Mobile edge cloud, and its evolution called access-independent edge-cloud would be a key enabler in caching commonly fetched content locally, which could provide new opportunities for the mobile network operator to optimize the transport network load. With the edge cloud, network operators can avoid carrying 'popular' content frequently, thereby minimizing the network load and actualize related cost optimizations.

Figure 3A:
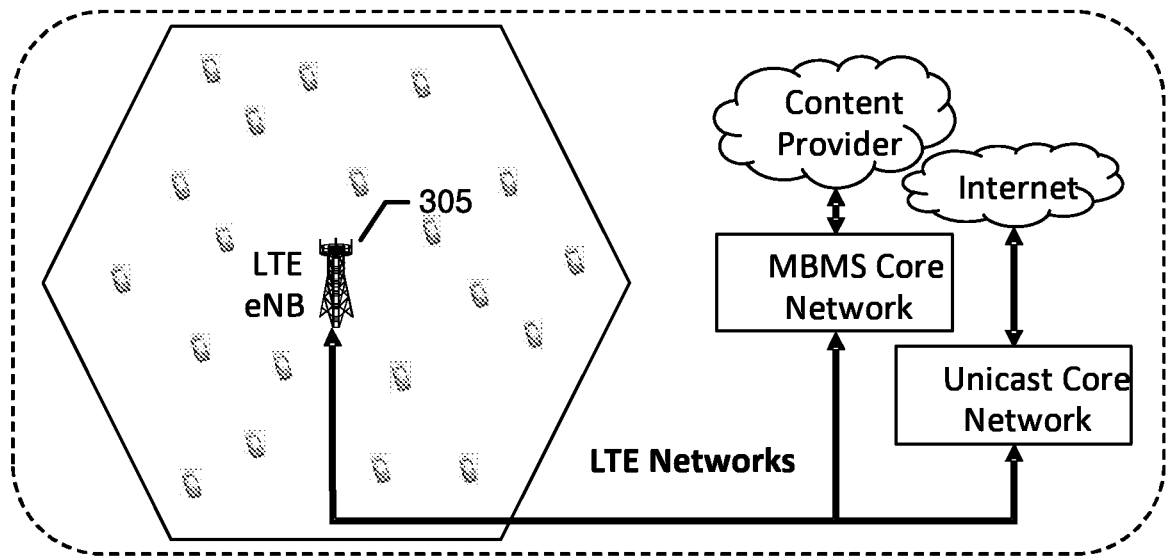
Figure 3B:
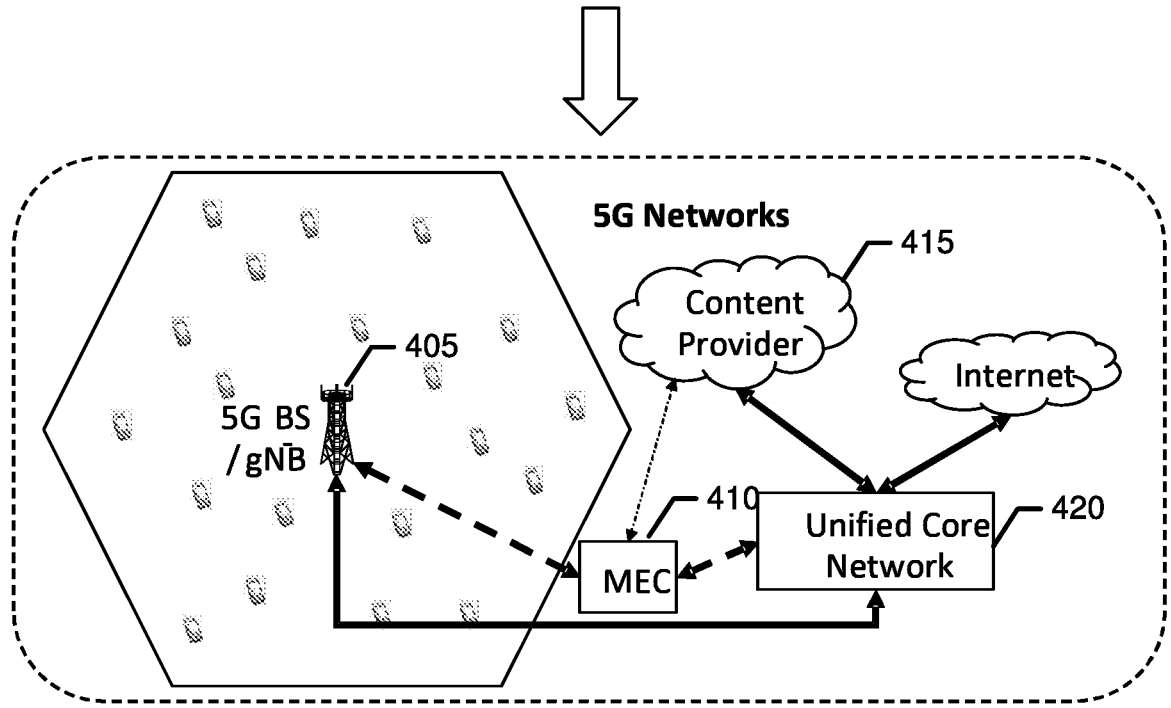

FIG. 3 shows a system that may be specifically configured in accordance with an example embodiment of the present invention. In particular, the overall scenario considered in this method from the perspective of MC/BC traffic is as shown in FIGS. 3A and 3B. As shown in FIG. 3A, the LTE networks (using eMBMS/feMBMS) are assumed to operate using dedicated RAN and core network entities for delivering MBMS traffic, using the LTE eNB 305. FIG. 3B, in 5G networks, due to the dynamic network consideration and the ability to flexibly deliver traffic, a unified core network that is tightly inter-coupled with the RAN and MEC 410 is assumed. The MC/BC content provider 415 delivers traffic using the unified 5G core network 420 to the 5G-base station (BS) or gNB (next generation base stations) 405.

In some embodiments, dynamic network slicing may be performed, for example, through which the network operator could slice their network, depending on the type of service and type of content that is being sent to the end user and based on the traffic mix in the network. In such a scenario, the RAN and core network may operate independently, with each 'slice' optimized to maximize the performance of the network.

One challenge with LTE-Broadcasting (LTE-B) is the tight interworking that may be required between the content provider network and the 3GPP network. For example, solutions may require defining the codecs that the content provider may use over the standardized interface with the 3GPP network. This was done mainly with the perspective that 3GPP network would be used instead of traditional broadcast network. In 5G, the main focus for MC/BC type of traffic would be from an Xcast perspective, where the RAN essentially would have the capability to dynamically map different types of traffic into appropriate transmission modes, in order to achieve the key 5G KPI of 10× higher spectral resource efficiency. From this perspective, the scenario shown in FIG. 3 related to 5G networks condenses to the one as shown in FIG. 4.

FIG. 4 shows the different types of Xcast traffic 425 and how, for example, the traffic flows through the unified core network 420 towards the 5G-BS/gNB 405, which could be tightly inter-coupled with the MEC 410 and delivers the traffic in a radio resource efficient manner to a multitude of users. Such a network architecture may also enable network operators to have novel cost-sharing mechanisms to deliver the content efficiently. For example, one such means of a cost-sharing mechanism may be through tailored advertisements for the end users. This may also provide opportunity for micro-operators or local operators to deploy their network for providing Xcast traffic with localized content for generating revenues.

Accordingly, embodiments herein provide systems, methods, apparatus and computer program products enabling new mechanisms facilitating efficient delivery of local tailored content, for example, enabling a revenue sharing system, to the end users in a seamless manner, without breaking the content from content provider. Moreover, embodiments, described herein provide the architecture, interface, and protocol enhancements required to enable the delivery of local tailored content to the end users Embodiments herein may also provide systems for enabling dynamic replacement of broadcast content with local content such as, for example, localized ads, location or user or context specific content delivered using Xcast (Explicit Multicast) protocol. Here Xcast means uni-, multi-, or broad-cast content and indicates the content delivery mechanism over the air interface to the end users, rather than the traffic type.

Embodiments herein may also provide systems for providing indications as to what content can be replaced by, for example, packet marking or indicating the time/content that can be overwritten. Embodiments herein may also provide systems for identifying a type of content, for example, indicating a type of content for replacement.

Embodiments herein may also provide systems for caching and prefetching the local content, allowing, for example, operation that is more efficient and furthermore, allowing faster start of the ads when the break starts, which may be applicable for large-scale media, low-latency or high data rate content, to minimize backhaul load.

Overview

In some embodiments, the inter-working function may provide information indicative of and/or related to the time intervals or periods of time where an advertisement or localized content may be provided by the mobile network.

In some embodiments, the original content provided by the content provider may either be replaced by the localized content during the specified time intervals or, in some embodiments, the content provider may stop sending content to the MC/BC network during those time intervals. In some embodiments, the information indicative of the periods of time may be assistance information from the content provider to indicate suitable time instances/parts of content that could be replaced by advertisements by the network operator. In some embodiments, the advertising content may be triggered for the end user depending on the user location within the coverage footprint of a 5G-BS/gNB. For example, the triggering may be done based on user location, applications being used, and in some embodiments, other user content information, to deliver tailored unicast content for the end user.

In a beam-based system with MC/BC, there may be beam specific advertising content meant for multiple users, which are in the physical location where the particular beam is directed. The location-specific mechanism assumes that the network knows the user location for Xcast content delivery, as compared to the traditional eMBMS considerations.

In some embodiments, the MC/BC localized content may be mapped to the appropriate bearers/sub-service flows or with appropriate bearer/flow-mapping to indicate to the UE application that the content is meant for the application, for example, to enable seamless delivery of end user, irrespective of the MC/BC content source. With sliced network, where there may be separate slices of MC/BC traffic, the 5G-BS may then map the content from localized source to the appropriate slices. Optionally, the slice over which the content is delivered to the end users might be signaled to the users as well.

In some embodiments, the advertisement content from the content provider may be provided with some additional packet marking in order to inform the network operator whether the packets may be overwritten or not by localized content. In some embodiments, the core network or 5G-BS/gNB (gigabit Node B) of the network operator may be configured to detect the packet marking and start fetching and delivering the localized content. This would be an alternative to time synchronization between the networks, for example, which may be relevant for live streaming of events.

In some embodiments, the content provider may also provide pre-negotiated packet marking to indicate the upcoming transition from the MC/BC content to the advertisement content, so that the network operator can initiate the localized content fetching and provision the content in a seamless manner.

The localized content may be cached in the MEC, and may then be synchronized/fetched by the 5G-BS using an open interface using standardized open APIs or information elements. Here, the MNO may require knowledge of the type or what kind of content those packets have so that the UE receiving them knows how to handle them. The MNOs know what type of content it should use for overwriting the marked packets, based on the indication from content provider, as part of the packet marking and related headers/signaling.

In some embodiments, synchronized time information may enable RAN to schedule a different set of packets from mobile networks to be provided to the end users. For example, during football world cup (WC) event, the MC/BC content may be provided by the content provider, with the advertisement from mobile network operator (MNO). This, in turn, provides possibilities for micro operators to provider overlapping content using unicast. Micro operators may schedule the localized content through either MC/BC or using unicast traffic. Unicast or MC/BC traffic may be superimposed with the MC/BC traffic from the content provider for non-disruptive advertisement content as well.

Time synchronization between content provider and mobile network can be achieved by using global positioning system (GPS) timer on both networks, which is pre-agreed, or based on time negotiation message that is sent along with the initiation of MC/BC session at the beginning of session establishment.

Implementation

In an example embodiment of the present invention, an apparatus or computer program product may be provided to implement or execute a method, process, or algorithm for facilitating coordinated content delivery in multicast/broadcast networks.

Some embodiments herein define interworking mechanisms between the 3GPP network and the content provider to enable dynamic delivery of content from a multitude of users in a seamless manner. An application of the method may therefore enable new business models where the network operator or micro operators may share the revenues with the content providers for the network operator or micro operators providing the delivery of the content to the end users. The overview of the proposed method is shown in FIGS. 5A and 5B, where the content provider network efficiently interworks with the 3GPP network. FIG. 5A shows a 3GPP network architecture, similar to that shown in FIG. 3A, and as such, description thereof is not repeated. Here the service break intervals are, for example, the time instances in which the content provider provides an indication, for example, of willingness to overwrite the source content with the localized content from the network operator. FIG. 5B shows a data flow. As shown at step 550, an interworking function may be defined. At step 555, content may be provided by and received at the MEC, the content comprising packet marking. Upon determination or detection of a content service break period, as shown at step 560, MEC may provide an indication to the 5G-BS of the content service break period. Optionally, during service breaks (e.g., during a service break period), the content provider may also be configured to discontinue the transmission of data, during which time the network operator may be configured to fetch the localized content for delivery. As shown at step 565, location content is fetched. The over-the-air delivery of the localized content may be done using Xcast, depending on the content type, number of users receiving it, QoS and other delay constraints, etc. Here the exchange of information regarding the service breaks may be conveyed using pre-negotiated time intervals (with time synchronization either done during session establishment or using external clocks, etc.) or using packet marking (e.g., for live events, where the service break timings would be dynamic, depending on the ongoing events in the live stream).

The Xcast delivery of traffic during service breaks is as shown in FIG. 6, where the network operator may tailor the advertisement content, for example, based on individual user preferences and deliver using unicast, or localize the content in terms of physical region and deliver using unicast or MC/BC. The localized advertisement could be related to businesses or shopping outlets that might be relevant for a particular area. If the content is provided by micro-operators, the content could be locally relevant for the micro-operators or means for generating revenues.

The signaling involved in delivering the localized content with the assistance of packet marking by the content provider is as shown in FIG. 7. For example, as shown at step 705, content may be delivered, the content comprising packet marking. At step 710, the content provider enters a content service break period, and subsequently, as shown in step 715, delivers content comprising packet marking indicative of the content service break period. As shown at step 720, 5G-BS fetches localized content and subsequently, as shown at step 730, delivers the localized content using, for example, Xcast. In those instances in which source content is still transmitted during the content service break period, the % G-BS may be configured to overwrite the source content. As shown in step 725, the content service break period ends, and as shown at step 735, the content provider resume providing content indicative thereof. As shown in this embodiment, the network operator, based on the packet marking may identify the type of traffic that is being carried and overrides the source content with the localized content when service break is indicated. This essentially may be done without any tight inter-working between the network operator and content provider. In some embodiments, the process shown in FIG. 7 may be done subsequent to an agreement being reached on the marking.

Embodiments herein also consider network slicing, where, for example, a 5G-BS/gNB may be configured to map the localized content to the appropriate slice which is delivering the MC/BC slice to the end user. The mapping of localized content to the content from the source may be done based on explicit indication from the RAN or based on application level interactions as well. The content could be delivered for the end user depending on their location tracking, user context information (browsing history, frequent downloads, online purchase history, etc.) to provide unicast content tailored for the end user. Indoor localization techniques could be used for micro-operator scenario where the connectivity is provided by for example shopping malls, where the advertisement could be relevant to the shops in the vicinity of the user. In a beam-based 5G system, this could also mean that the localized, location-based content is provided on a particular set of beams that are targeting specific directions.

Various options for delivering localized content based on slicing, location tracking, etc., is as shown in FIGS. 8A and 8B, which show exemplary architecture and data flows of the slicing aspects and beam-specific/location-based content delivery aspects in accordance with embodiments of the present invention. As shown at step 850, the content provider enters a content service break period, and subsequently, as shown at step 855, the 5G-BS fetches localized content. Next, as shown at step 860, the 5G-BS may be configured to map content to one or more particular slices. At step 865, content may be delivered from the appropriate sliced to a UE, for example, using Xcast. The method may also be applied to the multi-operator scenario, in which the connectivity for the multiple operators are provided by a local operator, for example, inside a shopping mall, in stadiums during popular sports or other events, etc., where the means for revenue sharing may be provided with the help of localized content delivery, thus enabling, for example, local/micro operators to offset the infrastructure cost, without having explicit licensing/resource sharing agreements. Also, the packet marking, etc., indication from the content provider helps the local/micro operator to automate the advertising without the need for someone to manually select where to insert advertisements in the content stream. The packet marking/signaling may also include some indication of value of a particular advertising, for example, for advertiser or from point of view of how much it disturbs the end user. For example, if the operator does not have that much advertising, it can prioritize certain opportunities and leave the original broadcast content for some others.

Operation

FIGS. 9-12 show a flowchart of the exemplary operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (for example, hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 9-12 when executed, convert a computer or processing circuitry into a particular machine configured to perform an example embodiment of the present invention. Accordingly, the operations of FIGS. 9-12 define an algorithm for configuring a computer or processing to perform an example embodiment. In some cases, a general purpose computer may be provided with an instance of the processor which performs the algorithms of FIGS. 9-12 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included as shown by the blocks having a dashed outline in FIGS. 9-12. It should be appreciated that each of the modifications, optional additions or amplifications below may be included with the operations above either alone or in combination with any others among the features described herein.

In some example embodiments, a method, apparatus and computer program product may be configured for facilitating the coordinated content delivery in multicast/broadcast networks. FIG. 9 is a flowchart showing an exemplary method of operating an example apparatus in accordance with an embodiment of the present invention.

As shown in block 905 of FIG. 9, an apparatus, for example, apparatus 20 embodied by the computing device 10, or the like, may be configured to receive content from a service provider during a content service period. The apparatus, for example, embodied by the computing device 10, or the like may therefore include means, such as the processor 22, the communication interface 26 or the like, for receiving content from a service provider during a content service period.

As shown in block 910 of FIG. 9, an apparatus, for example, apparatus 20 embodied by the computing device 10, or the like, may be configured to cause delivery of the content received from the service provider during the content service period. The apparatus, for example, embodied by the computing device 10, or the like may therefore include means, such as the processor 22, the communication interface 26 or the like, for causing delivery of the content received from the service provider during the content service period.

As shown in block 915 of FIG. 9, an apparatus, for example, apparatus 20 embodied by the computing device 10, or the like, may be configured to identify a content service break period. The apparatus, for example, embodied by the computing device 10, or the like may therefore include means, such as the processor 22, the communication interface 26 or the like, for identifying a content service break period. In some embodiments, the content service break period may be characterized by a break in transmission of content from the service provider intended for user devices. That is, a content service period may be characterized by the transmission of content intended for user devices, whereas a content service break period may be characterized by a break in the transmission of such content (i.e. content intended for user devices).

As shown in block 920 of FIG. 9, an apparatus, for example, apparatus 20 embodied by the computing device 10, or the like, may be configured to fetch localized content. The apparatus, for example, embodied by the computing device 10, or the like may therefore include means, such as the processor 22, the communication interface 26 or the like, for fetching localized content.

As shown in block 925 of FIG. 9, an apparatus, for example, apparatus 20 embodied by the computing device 10, or the like, may be configured to cause delivery of the localized content during the content service break period. The apparatus, for example, embodied by the computing device 10, or the like may therefore include means, such as the processor 22, the communication interface 26 or the like, for causing delivery of the localized content during the content service break period.

As shown in block 930 of FIG. 9, an apparatus, for example, apparatus 20 embodied by the computing device 10, or the like, may be configured to resume the reception of content from the service provider and causing delivery of the content. The apparatus, for example, embodied by the computing device 10, or the like may therefore include means, such as the processor 22, the communication interface 26 or the like, for resuming the reception of content from the service provider and causing delivery of the content. That is, the apparatus may be configured to, again, receive content from the service provider, the content, for example, intended for user devices.

In some example embodiments, a method, apparatus and computer program product may be configured for facilitating coordinated content delivery in multicast/broadcast networks where content service breaks are indicated by packet marking. FIG. 10 is a flowchart showing an exemplary method of operating an example apparatus in accordance with an embodiment of the present invention.

As shown in block 1005 of FIG. 10, an apparatus, for example, apparatus 20 embodied by the computing device 10, or the like, may be configured to receive content from a service provider during a content service period. The apparatus, for example, embodied by the computing device 10, or the like may therefore include means, such as the processor 22, the communication interface 26 or the like, for receiving content from a service provider during a content service period. In some embodiments, the content may comprise packet marking.

As shown in block 1010 of FIG. 10, an apparatus, for example, apparatus 20 embodied by the computing device 10, or the like, may be configured to identify, within the packet marking of the content, an indication of an upcoming transition to the content service break period. The apparatus, for example, embodied by the computing device 10, or the like may therefore include means, such as the processor 22, the communication interface 26 or the like, for identifying, within the packet marking of the content, an indication of an upcoming transition to the content service break period.

As shown in block 1015 of FIG. 10, an apparatus, for example, apparatus 20 embodied by the computing device 10, or the like, may be configured to cause initiation of the fetching of the localized content. The apparatus, for example, embodied by the computing device 10, or the like may therefore include means, such as the processor 22, the communication interface 26 or the like, for causing initiation of the fetching of the localized content. In some embodiments, for example, the apparatus may be configured to cause initiation of the fetching of the localized content and provide the content in seamless manner.

As shown in block 1020 of FIG. 10, an apparatus, for example, apparatus 20 embodied by the computing device 10, or the like, may be configured to identify, within the packet marking of the content, an indication of the content service break period. The apparatus, for example, embodied by the computing device 10, or the like may therefore include means, such as the processor 22, the communication interface 26 or the like, for identifying, within the packet marking of the content, an indication of the content service break period.

As shown in block 1025 of FIG. 10, an apparatus, for example, apparatus 20 embodied by the computing device 10, or the like, may be configured to fetch localized content. The apparatus, for example, embodied by the computing device 10, or the like may therefore include means, such as the processor 22, the communication interface 26 or the like, for fetching localized content.

As shown in block 1030 of FIG. 10, an apparatus, for example, apparatus 20 embodied by the computing device 10, or the like, may be configured to cause delivery of the localized content during the content service break period. The apparatus, for example, embodied by the computing device 10, or the like may therefore include means, such as the processor 22, the communication interface 26 or the like, for causing delivery of the localized content during the content service break period.

As shown in block 1035 of FIG. 10, an apparatus, for example, apparatus 20 embodied by the computing device 10, or the like, may be configured to continue to receive content comprising packet marking from the service provider. The apparatus, for example, embodied by the computing device 10, or the like may therefore include means, such as the processor 22, the communication interface 26 or the like, for continuing to receive content comprising packet marking from the service provider.

As shown in block 1040 of FIG. 10, an apparatus, for example, apparatus 20 embodied by the computing device 10, or the like, may be configured to identify, within the packet marking of the content, an indication of an end to the content service break period. The apparatus, for example, embodied by the computing device 10, or the like may therefore include means, such as the processor 22, the communication interface 26 or the like, for identifying, within the packet marking of the content, an indication of an end to the content service break period.

As shown in block 1045 of FIG. 10, an apparatus, for example, apparatus 20 embodied by the computing device 10, or the like, may be configured to cause a discontinuance of the delivery of the localized content and resumption of the content from the service provider. The apparatus, for example, embodied by the computing device 10, or the like may therefore include means, such as the processor 22, the communication interface 26 or the like, for causing a discontinuance of the delivery of the localized content and resumption of the content from the service provider.

In some example embodiments, a method, apparatus and computer program product may be configured for facilitating coordinated content delivery in multicast/broadcast networks wherein content service periods are scheduled allowing, for example, pre-fetching of localized content. FIG. 11 is a flowchart showing an exemplary method of operating an example apparatus in accordance with an embodiment of the present invention.

As shown in block 1105 of FIG. 11, an apparatus, for example, apparatus 20 embodied by the computing device 10, or the like, may be configured to receive content from a service provider during a content service period. The apparatus, for example, embodied by the computing device 10, or the like may therefore include means, such as the processor 22, the communication interface 26 or the like, for receiving content from a service provider during a content service period. In some embodiments, a content service break period may be scheduled.

As shown in block 1110 of FIG. 11, an apparatus, for example, apparatus 20 embodied by the computing device 10, or the like, may be configured to schedule localized content for transmission during the scheduled service break period. The apparatus, for example, embodied by the computing device 10, or the like may therefore include means, such as the processor 22, the communication interface 26 or the like, for scheduling localized content for transmission during the scheduled service break period. In some embodiments, the localized content may comprise a different set of packets to be provided to one or more user devices.

As shown in block 1115 of FIG. 11, an apparatus, for example, apparatus 20 embodied by the computing device 10, or the like, may be configured to fetch localized content for transmission during the scheduled service break. The apparatus, for example, embodied by the computing device 10, or the like may therefore include means, such as the processor 22, the communication interface 26 or the like, for Pre-fetching of localized content for transmission during the scheduled service break.

As shown in block 1120 of FIG. 11, an apparatus, for example, apparatus 20 embodied by the computing device 10, or the like, may be configured to determine a scheduled service break period. The apparatus, for example, embodied by the computing device 10, or the like may therefore include means, such as the processor 22, the communication interface 26 or the like, for determining a scheduled service break period.

As shown in block 1125 of FIG. 11, an apparatus, for example, apparatus 20 embodied by the computing device 10, or the like, may be configured to cause replacement of the content received from the service provider during the scheduled content service break period with the localized content. The apparatus, for example, embodied by the computing device 10, or the like may therefore include means, such as the processor 22, the communication interface 26 or the like, for causing replacement of the content received from the service provider during the scheduled content service break period with the localized content.

As shown in block 1130 of FIG. 11, an apparatus, for example, apparatus 20 embodied by the computing device 10, or the like, may be configured to cause delivery of the localized content during the content service break period. The apparatus, for example, embodied by the computing device 10, or the like may therefore include means, such as the processor 22, the communication interface 26 or the like, for causing delivery of the localized content during the content service break period.

As shown in block 1135 of FIG. 11, an apparatus, for example, apparatus 20 embodied by the computing device 10, or the like, may be configured to determine the end of the scheduled service break period. The apparatus, for example, embodied by the computing device 10, or the like may therefore include means, such as the processor 22, the communication interface 26 or the like, for determining the end of the scheduled service break period.

As shown in block 1140 of FIG. 11, an apparatus, for example, apparatus 20 embodied by the computing device 10, or the like, may be configured to cause a discontinuance of the delivery of the localized content and resumption of the content from the service provider. The apparatus, for example, embodied by the computing device 10, or the like may therefore include means, such as the processor 22, the communication interface 26 or the like, for causing a discontinuance of the delivery of the localized content and resumption of the content from the service provider.

In some example embodiments, a method, apparatus and computer program product may be configured for facilitating coordinated content delivery in multicast/broadcast networks, where localized content may be beam-specific and, for example, tailored based on locations of and/or applications being executed on one or more user devices. FIG. 12 is a flowchart showing an exemplary method of operating an example apparatus in accordance with an embodiment of the present invention.

As shown in block 1205 of FIG. 12, an apparatus, for example, apparatus 20 embodied by the computing device 10, or the like, may be configured to receive content from a service provider during a content service period. The apparatus, for example, embodied by the computing device 10, or the like may therefore include means, such as the processor 22, the communication interface 26 or the like, for receiving content from a service provider during a content service period.

As shown in block 1210 of FIG. 12, an apparatus, for example, apparatus 20 embodied by the computing device 10, or the like, may be configured to cause delivery of the content received from the service provider during the content service period. The apparatus, for example, embodied by the computing device 10, or the like may therefore include means, such as the processor 22, the communication interface 26 or the like, for causing delivery of the content received from the service provider during the content service period.

As shown in block 1215 of FIG. 12, an apparatus, for example, apparatus 20 embodied by the computing device 10, or the like, may be configured to identify a content service break period. The apparatus, for example, embodied by the computing device 10, or the like may therefore include means, such as the processor 22, the communication interface 26 or the like, for identifying a content service break period. In some embodiments, the content service break period may be characterized by a break in transmission of content from the service provider intended for user devices.

As shown in block 1220 of FIG. 12, an apparatus, for example, apparatus 20 embodied by the computing device 10, or the like, may be configured to determine or receive information indicative of a location of one or more user devices. The apparatus, for example, embodied by the computing device 10, or the like may therefore include means, such as the processor 22, the communication interface 26 or the like, for determining or receiving information indicative of a location of one or more user devices. For example, the apparatus may be configured to determine, receive, or otherwise access a GPS location of one or more user devices, a Wi-Fi access point to which one or more user devices attached, etc.

As shown in block 1225 of FIG. 12, an apparatus, for example, apparatus 20 embodied by the computing device 10, or the like, may be configured to determine or receive information indicative of a particular application being executed at a user device. The apparatus, for example, embodied by the computing device 10, or the like may therefore include means, such as the processor 22, the communication interface 26 or the like, for determining or receiving information indicative of a particular application being executed at the user device.

As shown in block 1230 of FIG. 12, an apparatus, for example, apparatus 20 embodied by the computing device 10, or the like, may be configured to fetching localized content. The apparatus, for example, embodied by the computing device 10, or the like may therefore include means, such as the processor 22, the communication interface 26 or the like, for fetching localized content, for example, based on one or more of the location of a user device or an application being urn on the user device.

As shown in block 1235 of FIG. 12, an apparatus, for example, apparatus 20 embodied by the computing device 10, or the like, may be configured to, in an instance in which the localized content is beam-specific content, map, within a sliced network, the beam-specific content from a localized source to appropriate slices. The apparatus, for example, embodied by the computing device 10, or the like may therefore include means, such as the processor 22, the communication interface 26 or the like, for, in an instance in which the localized content is beam-specific content, mapping, within a sliced network, the beam-specific content from a localized source to appropriate slices.

As shown in block 1240 of FIG. 12, an apparatus, for example, apparatus 20 embodied by the computing device 10, or the like, may be configured to cause delivery of the localized content during the content service break period. The apparatus, for example, embodied by the computing device 10, or the like may therefore include means, such as the processor 22, the communication interface 26 or the like, for causing delivery of the localized content during the content service break period. For example, the apparatus may be configured for transmitting the content to a base station for distribution to one or more user devices.

As shown in block 1245 of FIG. 12, an apparatus, for example, apparatus 20 embodied by the computing device 10, or the like, may be configured to resume the reception of content from the service provider and, in some embodiments, cause delivery of the content. The apparatus, for example, embodied by the computing device 10, or the like may therefore include means, such as the processor 22, the communication interface 26 or the like, for resuming the reception of content from the service provider and causing delivery of the content.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving content from a service provider during a content service period;
   identifying a content service break period, the content service break period characterized by a break in transmission of content, from the service provider, intended for user devices;
   determining a location of a user device;
   fetching beam-specific content for the location of the user device;
   mapping, within a sliced network comprising separate slices of multicast (MC)/broadcast (BC) traffic, the beam-specific content from a localized source to appropriate slices to indicate to a particular application being executed at the user device, that the content is meant for the particular application; and
   causing delivery of the beam-specific content during the content service break period, the delivery of the beam-specific content being performed via multicast or broadcast.

2. The method according to claim 1, further comprising:
   identifying, within a packet marking of the content, an indication of the content service break period.

3. The method according to claim 2, further comprising:
   continuing to receive content comprising packet marking from the service provider;
   identifying, within the packet marking of the content, an indication of an end to the content service break period; and
   causing a discontinuance of the delivery of the beam-specific content and resumption of the content from the service provider.

4. The method according to claim 3, further comprising:
   identifying, within the packet marking of the content, an indication of an upcoming transition to the content service break period; and
   causing initiation of the fetching of the beam-specific content.

5. The method according to claim 1, further comprising:
   determining a scheduled service break period characterized in that content is not received from the content provider.

6. The method according to claim 1, further comprising:
   determining a scheduled service break period characterized in that content received from the service provider during a scheduled content service break period is not transmitted; and
   causing replacement of the content received from the service provider during the scheduled content service break period with the beam-specific content.

7. The method according to claim 1, wherein the beam-specific content is fetched in accordance with the location of the user device.

8. The method according to claim 1, further comprising:
determining or receiving information indicative of a particular application being executed at the user device, wherein the beam-specific content is fetched in accordance with the particular application.

9. An apparatus comprising at least one processor and at least one memory including computer program code, the at least one memory and the computer program code configured to, with the processor, cause the apparatus to at least:
receive content from a service provider during a content service period;
identify a content service break period, the content service break period characterized by a break in transmission of content from the service provider intended for user devices;
determine a location of a user device;
fetch beam-specific content for the location of the user device;
map, within a sliced network comprising separate slices of multicast (MC)/broadcast (BC) traffic, the beam-specific content from a localized source to appropriate slices to indicate to a particular application being executed at the user device, that the content is meant for the particular application; and
cause delivery of the beam-specific content during the content service break period, the delivery of the beam-specific content being performed via multicast or broadcast.

10. The apparatus according to claim 9, wherein the at least one memory and the computer program code are further configured to, with the processor, cause the apparatus to:
identify, within a packet marking of the content, an indication of the content service break period.

11. The apparatus according to claim 10, wherein the at least one memory and the computer program code are further configured to, with the processor, cause the apparatus to:
continue to receive content comprising packet marking from the service provider;
identify, within the packet marking of the content, an indication of an end to the content service break period; and
cause a discontinuance of the delivery of the beam-specific content and resumption of the content from the service provider.

12. The apparatus according to claim 11, wherein the at least one memory and the computer program code are further configured to, with the processor, cause the apparatus to:
identify, within the packet marking of the content, an indication of an upcoming transition to the content service break period; and
cause initiation of the fetching of the beam-specific content.

13. The apparatus according to claim 9, wherein the at least one memory and the computer program code are further configured to, with the processor, cause the apparatus to:
determine a scheduled service break period characterized in that content is not received from the content provider.

14. The apparatus according to claim 9, wherein the at least one memory and the computer program code are further configured to, with the processor, cause the apparatus to:
determine a scheduled service break period characterized in that content received from the service provider during a scheduled content service break period is not transmitted; and
cause replacement of the content received from the service provider during the scheduled content service break period with the beam-specific content.

15. The apparatus according to claim 9, wherein the at least one memory and the computer program code are further configured to, with the processor, cause the apparatus to:
determine or receive information indicative of a location of a user device, wherein the beam-specific content is fetched in accordance with the location of the user device.

16. The apparatus according to claim 9, wherein the at least one memory and the computer program code are further configured to, with the processor, cause the apparatus to:
determine or receive information indicative of a particular application being executed at the user device, wherein the beam-specific content is fetched in accordance with the particular application.

17. A computer program product comprising at least one non-transitory computer-readable storage medium having computer-executable program code instructions stored therein, the computer-executable program code instructions comprising program code instructions for:
receiving content from a service provider during a content service period;
identifying a content service break period, the content service break period characterized by a break in transmission of content from the service provider intended for user devices;
determining a location of a user device;
fetching beam-specific content for the location of the user device;
mapping, within a sliced network comprising separate slices of multicast (MC)/broadcast (BC) traffic, the beam-specific content from a localized source to appropriate slices to indicate to a particular application being executed at the user device, that the content is meant for the particular application; and
causing delivery of the beam-specific content during the content service break period, the delivery of the beam-specific content being performed via multicast or broadcast.

18. The method according to claim 1, wherein said causing delivery of the beam-specific content comprises transmitting the beam-specific content to a base station for distribution to one or more user devices.

19. The apparatus according to claim 9, wherein the at least one memory and the computer program code are further configured to, with the processor, cause the apparatus to at least transmit the beam-specific content to a base station for distribution to one or more user devices.

* * * * *